Dec. 29, 1942.   R. PATERAS PESCARA   2,306,978
INSTALLATION FOR GENERATING GAS UNDER PRESSURE
Filed Nov. 3, 1939   4 Sheets-Sheet 3

INVENTOR
RAUL PATERAS PESCARA,
BY Bailey & Chaven
ATTORNEYS

Dec. 29, 1942.  R. PATERAS PESCARA  2,306,978
INSTALLATION FOR GENERATING GAS UNDER PRESSURE
Filed Nov. 3, 1939    4 Sheets—Sheet 4

INVENTOR
RAUL PATERAS PESCARA,
BY
ATTORNEYS

Patented Dec. 29, 1942

2,306,978

UNITED STATES PATENT OFFICE 2,306,978

INSTALLATION FOR GENERATING GAS UNDER PRESSURE

Raul Pateras Pescara, Paris, France, assignor of one-tenth to Societe d'Etudes et de Participations, Eau, Gaz, Electricite, Energie S. A., Geneva, Switzerland, a society of Switzerland Application November 3, 1939, Serial No. 302,792
In Luxemburg November 12, 1938

29 Claims. (Cl. 230—56)

The present invention relates to groups of generators of fluid under pressure, for example, to groups of generators of compressed air, or of a mixture of air and exhaust gas under pressure. The invention concerns free-piston machines more particularly, because it is in their case that its application appears that it ought to present the greatest interest, although not exclusively so. The pistons of free piston machines are of freely variable stroke, as opposed to machines with crank-shafts, in which the positions of the dead points of the pistons are imperatively imposed by kinematic mechanisms.

The principal object of the invention is to arrange the said machines so that they will respond to the different conditions of practice better than previously.

According to an essential feature of the present invention, I provide—in a group of the kind in question, in which the number of generator units put into service is variable—means for automatically regulating the feeding with fuel of the generator units in service in such a manner that at every instant such units will appreciably develop the same fraction of their maximum power.

According to another feature of the present invention, I provide a group of machines of the kind in question with regulating means for automatically varying the number of generator units in service for certain variations at least of the working requirement of the receiving element and I arrange the said regulating means so that the number of units in service may be such that the said units generally operate in the regulating zone which is the most favourable for their good efficiency.

According to a third feature of the present invention I provide a group of generators of the kind in question with means for maintaining the units at rest in a thermic state favourable to their starting.

Other features of the present invention will be hereinafter described with reference to the accompanying drawings, given merely by way of example, and in which.

The following detailed description with reference to the drawings relates to the case of a group of compressed air generators with free pistons to feed a receiving element consisting of the motor cylinders 1 of a locomotive 2.

Figure 1:
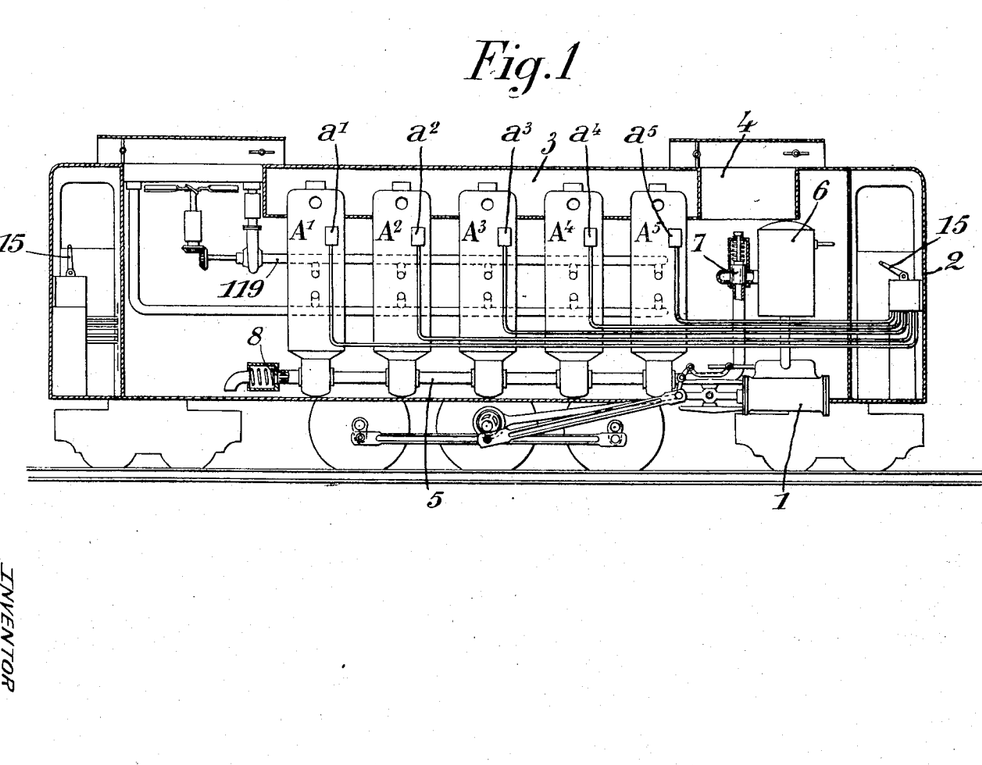
Fig. 1 shows, diagrammatically and in elevation, a compressed air driven locomotive provided with a group of generators made in accordance with the invention.

A plurality of free-piston generators, for example, five of such machines $A^1$ to $A^5$, is arranged in any suitable manner on the locomotive 2, for example, vertically and side by side as shown diagrammatically in Fig. 1. The said generators suck air into a common sleeve 3 fed through a filter 4 and arranged in the upper part of the locomotive. The compressed air is discharged into a common manifold 5 feeding a cylindrical tank 6 connected to the motor cylinders 1.

A retension valve 7 is advantageously provided to permit the tank 6 to be isolated from the manifold 5 when the pressure in the latter falls below a predetermined limit because of a certain fall of pressure in the said tank. A discharge valve 8 submitted to the action of a spring is also provided on the manifold 5.

Means may be provided for regulating the feeding of fuel to the generator units in service automatically, in such a manner that at every instant the units develop appreciably the same fraction of their maximum power, this being the case when all the generators are always in service as well as in that, which will be dealt with hereinafter, in which certain of them are put out of service in certain circumstances.

If the compressed air generators $A^1$ to $A^5$ are of the fuel injection type, as will be assumed hereinafter, the automatic regulating means can advantageously be constituted by making the fuel injection pump 9 of each of the generators co-act with a control device submitted to the action of a regulating factor common to all the generators in service. For example, to the pressure in the discharge manifold 5 or to a pressure which is a function of the pressure in the said manifold, such as the discharge pressure of a lower stage of each generator.

Figure 2:
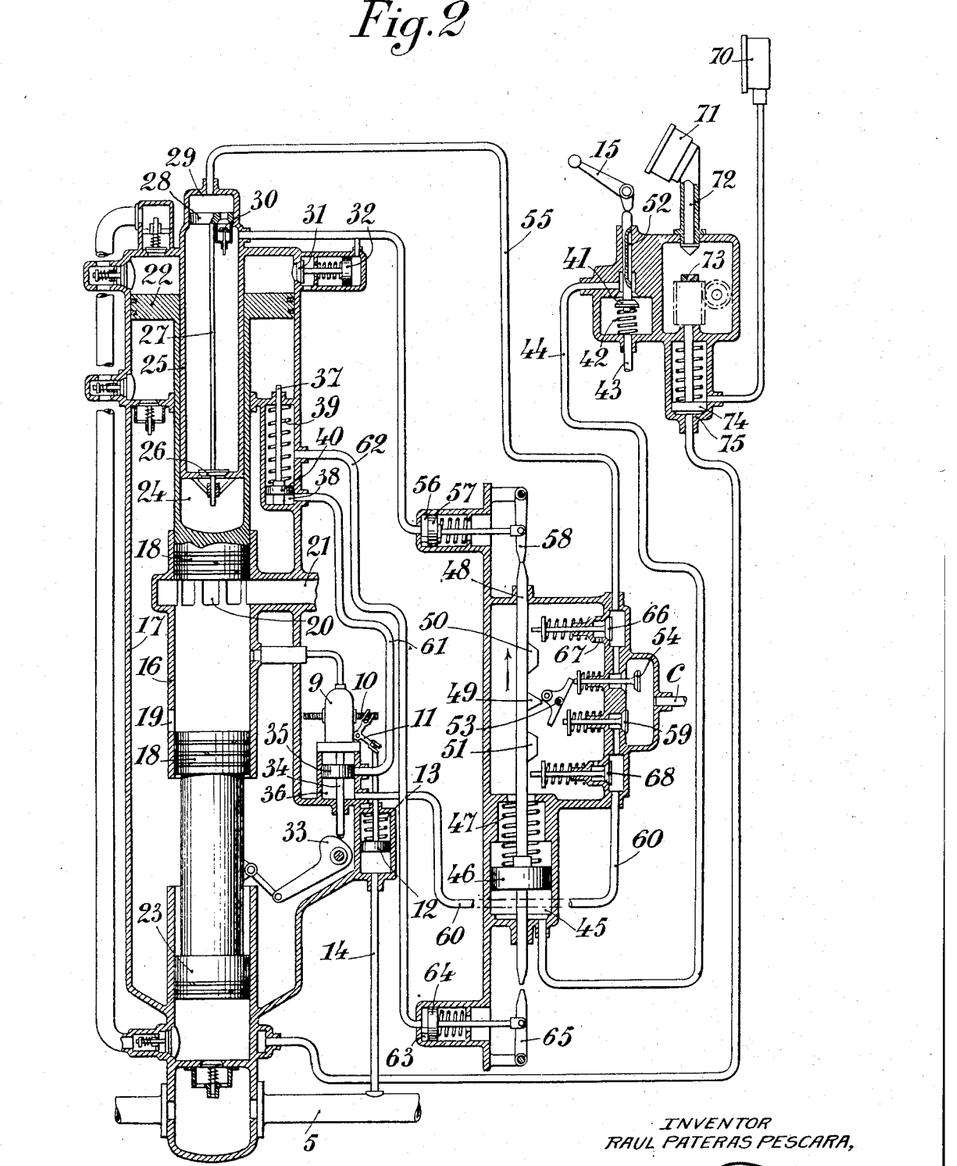
Fig. 2 shows, diagrammatically, one of the said generators and its remote control means.

To that end, use can be made of the means illustrated in Fig. 2, according to which the quantative regulating member 10 of the fuel pump 9 is connected, by the aid of a bell crank lever 11, to the rod of a piston 12, one of the faces of which is under the action of a spring 13 tending to cause maximum injection, while its other face is put under the action of the regulating pressure in the manifold 5 by the aid of a pipe 14.

It will be easily understood that, with such means of regulation, the degree of fuel injection will be the same for the different generators in service, and that this degree will be determined by a pressure common to all the generators. Moreover, if the generators in service have the same maximum power, they will furnish appreciably the same quantity of work during their common period of operation.

It has been assumed above that the power of the plant is regulated by acting on the degree of injection of fuel to each generator. The power could be acted upon in known manner, moveover, by putting certain generators into and out of service, taking into account the demands of the power of the receiving element.

Thus, as concerns the putting into and out of service of certain of the generators $A^1$ to $A^5$, a particularly simple solution can be followed which leaves it entirely at the will of the operator. Each of the said generators is provided with a starting device (represented diagrammatically at $a^1$, $a^2$ ... $a^5$ in Fig. 1) which is subordinated by mechanical, pneumatic, electric or any other means to a control member such, for example, as a hand lever or the like 15 arranged near the operator, two sets of such hand grips being advantageously provided respectively at the front and at the rear of the locomotive 2, as shown.

If, as seems generally more advantageous, use is made of pneumatic control means for ensuring the starting and the stopping of the generators $A^1$ to $A^5$, each of the generators and its own means of control can be formed as illustrated in Fig. 2.

The generators are made in any suitable usual manner, for example, so that they can be started by the introduction of compressed air into one at least of their variable volume spaces. For example, there are arranged in a motor cylinder 16 surrounded with an air-tight casing 17, two motor pistons 18, respectively adapted, near their outer dead points, to uncover inlet ports 19 opening into the said casing and exhaust ports 20 through which the products of combustion can pass into an exhaust pipe 21.

One of the said motor pistons is extended to form a piston 22, one of the faces of which provides a first compression stage, whilst its other ensures the feeding of the casing 17 with scavenging air under pressure. The other motor piston is extended to form a piston 23 adapted to provide the second compression stage and to ensure the discharge of the compressed air into the manifold 5. The said two pistons are interconnected by a well known synchronisation mechanism, not shown in the drawings.

In the body of the piston 22 there is formed a space 24 with which a fixed, hollow piston 25 co-acts so as to form a pneumatic energy accumulator.

A valve 26 may be adapted to provide communication between the interior of the piston 25 and the chamber 24, the valve having a rod 27 which is furnished with a piston 28 sliding in a cylinder 29. The piston 28 comprises at least one valve 30, formed in such a manner as to allow the introduction of compressed air into the interior of the piston 25.

The low pressure cylinder is provided with a discharge valve 31 normally kept closed by the action of the pressure on a piston 32 integral with the valve stem.

The piston of the fuel injection pump 9 is controlled by one of the alternating mechanisms of the machine, for example, by the high pressure compressor piston 23, to which is connected an oscillating cam 33 co-acting with the piston of the pump by the aid of a push member 34 provided with a piston 35 slidably mounted in a cylinder 36. The function of the said cylinder-piston assembly is more particularly indicated hereinafter.

There may also be provided mechanisms for setting the movable mechanisms into starting position, which can comprise, for example, a rod 37 adapted to co-act with the low pressure piston 22 when a cylinder 38 is put under pressure, a piston 40 integral with the rod 37 being slidable in the cylinder against the action of a spring 39.

The means for permitting the starting or the stopping of such a generator pneumatically by the aid of the hand grip 15 are formed in such a manner that, according to the position of the said hand grip, they may act to ensure the putting under pressure of the interior of the piston 25 and the passage of the compressed air contained therein into the accumulator 24 when it is desired to start the generator. On the other hand, the said means may act to relieve the push member 34 from the action of the cam 33 and then to bring back the alternating mechanisms into a starting position when it is desired to stop the machine.

The hand grip 15 controls a valve 41 which is normally held on its seat by a spring 42 and adapted, when it is in the open position, to permit the compressed air, fed from an external source through a pipe 43, to pass into a cylinder 45 through a pipe 44. A piston 46 is slidably mounted in the cylinder 45 against the action of a spring 47, the rod 48 of the said piston carrying three compressed air distributing cams 49, 50 and 51 whose function will be described hereinafter.

When the valve 41 is in its closed position it permits the compressed air contained in the cylinder 45 to escape to the atmosphere through a bleeder 52 formed on the valve stem and of such a length that it may be unmasked only in the closed position of the said valve.

The cam 49 is arranged to co-act with a rocker 53 adapted, when the rod 48 is displaced in one direction, to open a valve 54 allowing a pipe c, leading from an external source of compressed air, to be connected to the cylinder 29 through a pipe 55 and then to an assembly of a cylinder 56 and a piston 57 adapted, against the action of a spring, to cause the displacement of a knife edge 58 limiting the up-stroke of the rod 48.

Movement of the rod 49 in the opposite direction opens a valve 59, allowing the said conduit c to communicate first through a pipe 60 with the cylinder 36 in which the piston 35 integral with the control push member of the injection pump is slidable then, through a pipe 61, with the cylinder 38 for the setting into starting position of the reciprocating mechanisms and, finally, through a pipe 62 with an assembly of a cylinder 63 and a piston 64 adapted, against the action of a return spring, to cause the displacement of a knife edge 65 limiting the down-stroke of the rod 48.

The cam 50 is arranged in such a fashion that after the knife edge 58 has been displaced it can bring about the opening of a valve 66 adapted to put the pipe 55 into communication with a port 67 opening to the atmosphere and thus to ensure the starting of the machine.

Similarly, the cam 51 is arranged in such a manner that after the displacement of the knife edge 65, it can ensure the opening of a valve 68 which, when open, is adapted to permit the discharge of the cylinder 36 through a port 69.

When the hand grip 15 is brought into the position shown on the drawing, in which the valve 41 is open, the compressed air from the said external source causes the displacement of the piston 46 against the action of the spring 47. The rod 48 is forced in the direction of the arrow and, before the end of the rod abuts against the knife edge 58, the cam 49 causes the opening of the valve 54. In passing through the pipe 55 and past the valve 30, the compressed air fed from the pipe c first fills the interior of the piston 25 and then the cylinder 56, whereby the displacement of the knife edge 58 is caused. The rod 48 can then continue its movement in the direction of the arrow. This complementary movement causes the cam 50 to open the valve 66, the cylinder 29 is emptied of the compressed air contained therein and as the two faces of the piston 28 are no longer submitted to the same pressure, the piston is displaced, carrying with it the valve 26. The compressed air contained in the interior of the fixed piston 25 expands into the accumulator 24, thus ensuring the starting of the alternating mechanisms of the machine.

If the operator now desires to stop the generator, it is sufficient for him to bring the hand grip 15 into a position in which the valve 41 is closed, the said bleeder 52 ensuring the putting into communication of the cylinder 45 with the atmosphere. The rod 48 is then forced by the spring 47 in the direction opposite to that of the arrow, the cam 49 opens the valve 59 and the piston 35 is kept in the up position by the air under pressure coming from the pipe c, whereby the operation of the fuel injection pump 9 is interrupted. The said air under pressure then flows through the pipe 61 (the opening of which into the cylinder 36 is uncovered when the piston 35 is in its up position) into the cylinder 38. The piston 40 is displaced and the rod 37 brings the compressor pistons into a starting position. At the end of the stroke, the piston 40 unmasks the opening of the pipe 62 and the compressed air acts on the piston 64 and causes the displacement of the knife edge 65.

The rod 48 can then carry out its down stroke and the cam 51 can bring about the opening of the valve 68 and thus the discharge of air from the cylinder 36. The pistons 35 and 40 are thus removed from the action of the air under pressure, the rod 37 is moved into the cylinder 38 and the push member 34 is again in a position to operate. The machine is thus ready for a new starting operation.

Each of the generators $A^1$ to $A^5$ may be provided with a manometer 70, Fig. 2, branched on the discharge of one of the stages of the generator, and with a counter 71 of working hours. The driving shaft 72 of the counter co-acts with a coupling device 73, arranged in such a manner as to permit the operation of the counter when the generator discharges compressed air. The said device may consist of a direct-drive dog-clutch, the movable element of which is brought into operative position at the desired moment by a piston 74 slidable in a cylinder 75 connected to the low pressure stage of the generator.

In the form shown, cylinder 75 is connected to the output passage of the low pressure cylinder by a pipe $70^1$. As long as the compressor is operating, pressure will be maintained in this pipe and will push the piston and the clutch member 72. Clutch member 73 has rigid with it an elongated pinion $73^1$ meshing with a continuously driven worm $74^1$. When the generator is not operating, however, spring $75^1$ will push piston 74 downward and disconnect clutch 72, 73 so that the counter will not register.

Manometer 70 is not connected with the low pressure outlet through pipe $70^1$ whenever the generator is operating, since piston 74 is raised above its point of communication with cylinder 75.

It should be noted that the operator will also be interested in ensuring a uniform wear of the whole of the apparatus by taking note of the indications furnished by the different counters, and in acting in such a manner that all the generators may have substantially the same number of hours of operation.

In the preceding description, it has been assumed that the variations of power of the installation, by putting in or out of circuit certain generators, were realized at will by the operator.

In order to provide the said variations of power, however, use may be made of means automatically ensuring the putting into and out of service of certain generators as a function of the delivery demand of the receiving element, that is, of the motor cylinders 1 of the locomotive.

It has already been proposed to make use of automatic means of this kind but, up to the present, in each delivery interval corresponding to the same number of generators in service, the complementary regulation of the plant was carried out by variation of the degree of injection of fuel in one only of the machines of the plant, the other machines working at maximum power.

That solution had the inconvenience that the machine on which the complementary regulation operated worked only exceptionally in its zone of best operation (for example, between 60% and 90% of its maximum power for a free piston machine) the said inconvenience being the more appreciable as the plant comprises fewer generators.

It will be easily understood that the said inconvenience will be avoided if there is subordinated to the automatic means for the putting into and out of service of certain generators, a group of generators such as that just described, that is to say, a group of generators of which all the units in service have their degree of fuel injection regulated similarly.

In fact, in this case, in each zone of regulation corresponding to the same number of units in service, the variations of delivery required by the receiving element will cause a variation of the degree of fuel injection of all the generators in service. The variations of power of the plant in the zone concerned will be distributed between the said generators in service, and the latter can thus be maintained easily in the zone of operation favourable to their good efficiency because the limits of regulation in which they may be called upon to operate are much less varied than in the case wherein the whole of the complementary regulation is effected on a single generator.

Thus, advantageously, as a regulating factor for determining the putting into or out of service of certain of the generators $A^1$ to $A^5$, there may be chosen the pressure in the discharge manifold 5, common to all the generators, that pressure increasing when the delivery demanded by the motor cylinders diminishes. In this case, the regulating means should ensure the putting out of service of one or more generators. The said pressure diminishes when the delivery demanded by the said motor cylinders increases, in which case the regulating means should ensure the putting into service of one or more machines.

Account being taken of what has just been stated, the said regulating means can be formed in such a manner that they only play the part of a corrector, that is to say, in such a manner that they modify the number of generators put into service by the driver, if that is necessary, the latter, however, retaining the ability of putting into service, at will, any number of generators.

On the contrary, the said regulating means can be arranged in such a manner that they are entirely automatic, that is to say, in such a manner that they assume to themselves alone the control (starting of a certain number of machines and then modifications of this number) of all the generators.

In any case, the regulating means are preferably so arranged that they will only intervene in permanent working so as to avoid too numerous startings and stoppings. For example, a certain delay may be provided in the time of putting into action of the said means.

Moreover, it may be of interest to act in such a manner that the putting into and out of service of the generators $A^1$ to $A^5$ is effected in the same order, so as not to cause certain of the said generators to work more especially.

Figure 3:
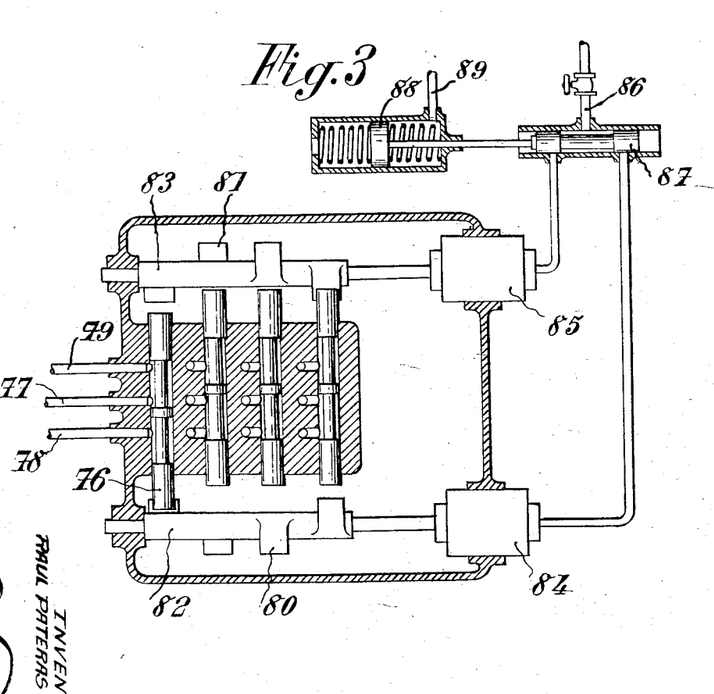
Fig. 3 shows one construction of means for regulating automatically the said group of generators.

Thus, in order to constitute the said automatic regulating means for the putting into or out of service of certain units use may be made of the construction shown in Fig. 3.

There is provided for each generator a starting and stopping distributor 76, which is so constructed that, in accordance with the position which it occupies, it allows a pipe 77 leading to the starting system of the said generator (control cylinder of the cams 49 to 51, Fig. 2) to communicate either with a conduit 78 connected to an external source of compressed air (in order to ensure the starting of the generators) or with a discharge conduit 79 for ensuring the stopping of the said generators.

In order to bring the said distributors into one or the other of these positions, there are provided two sets of cams 80 and 81, respectively mounted on two shafts 82 and 83 driven by two fluid motors 84 and 85, the said cams preferably being regularly spaced in each group.

On the feed pipe 86 of the fluid motors arranged to drive the motors 84 and 85, there is arranged a distributor 87 adapted to occupy two working positions corresponding, respectively, to the feeding of one or the other of the said motors and a neutral position (shown in Fig. 3).

The distributor is controlled by a balanced piston 88, one of the faces of which, through a pipe 89, is subjected to the action of the regulating pressure in the manifold 5, in such a manner that an excess of pressure ensures the starting of the motor 85 controlling the stopping cams of the generators, whilst a decrease of pressure ensures the starting of the motor 84 controlling the starting cams.

Figure 4:
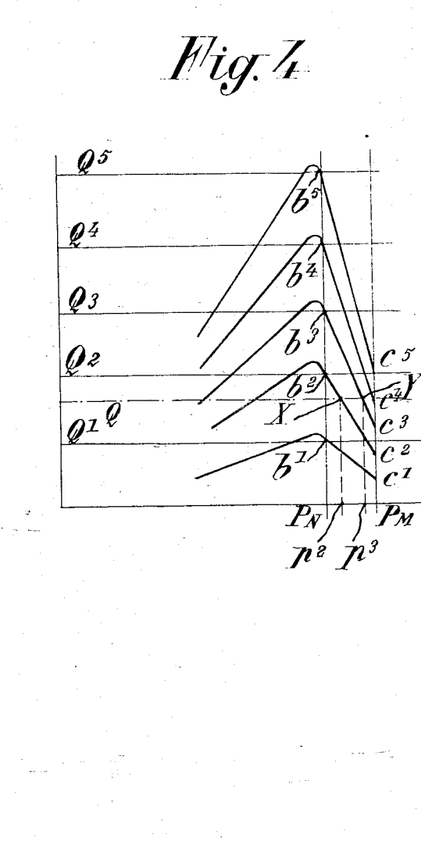
Fig. 4 is a diagram relating to the functioning of the regulating means.

On Fig. 4, there is shown a delivery pressure diagram, relating to the functioning of the group of five generators previously referred to.

On the diagram, the curves $b^1c^1$ to $b^5c^5$ respectively correspond to the working case in which there are 1, 2, 3, 4 or 5 units in service, the characteristics of regulation of the fuel injection of each generator having been assumed to have been chosen in such a manner, according to a known principle, that in a regulating zone comprised between a normal operating pressure $P_N$ (for example 16 kg.) and a maximum admissible pressure $P_M$ (for example 16.5 kg.) the delivery of the generators in service diminishes when their delivery pressure increases.

It is seen that in a delivery zone such as that comprised between a delivery $Q^1$ and a delivery $Q^2$, the demands of the receiving element can be satisfied by the aid of two machines, the pressure varying from the neighborhood of $P_M$ to $P_N$ when the delivery required increases from $Q^1$ to $Q^2$. Similarly from $Q^2$ to $Q^3$ the said requirements can be satisfied by the aid of three generators and so on. On the diagram it will also be seen that the same delivery Q (comprised for example between $Q^1$ and $Q^2$) can be obtained by the putting into service of different numbers of generators, that is to say, for the case in question, by two generators delivering at the pressure $p^2$ (point X) or by three generators discharging at the pressure $p^3$ (point Y).

Now, if the initial tension of the return spring of the balanced piston 88 is chosen in such a manner that the latter is only displaced for variations of pressure at least equal to the interval $P_NP_M$ (a necessary condition in order that the plant may be able to operate in a stable manner with a single generator in service between the extreme pressures $P_N$ and $P_M$) the delivery Q will be obtained with two generators if the initial delivery was comprised between $Q^1$ and $Q^2$, whilst the same delivery will be obtained with three generators if the initial delivery was comprised between $Q^2$ and $Q^3$.

It is to be noted that, for example, by modifying the initial strength of the spring of the piston 88, or by causing a variable pressure to act on the non-active face of the latter, it is possible to modify the position of the zone $P_NP_M$ in which the regulation is effected.

However, there will always be the possibility of realizing the same delivery with different numbers of units.

It is preferable always to have the minimum number of generators in service, so that the latter operate in the neighbourhood of the pressure $P_N$ more favourable to their good working.

In particular, in the case of the delivery Q chosen by way of example, it is preferable to have two generators operating at the pressure $p^2$ (point X) than three operating at the pressure $p^3$ (point Y). Thus, the automatic regulating means of the plant can be formed in such a manner that they permit of obtaining generally the putting into service of the minimum number of generators for obtaining a determined delivery.

Figure 6:
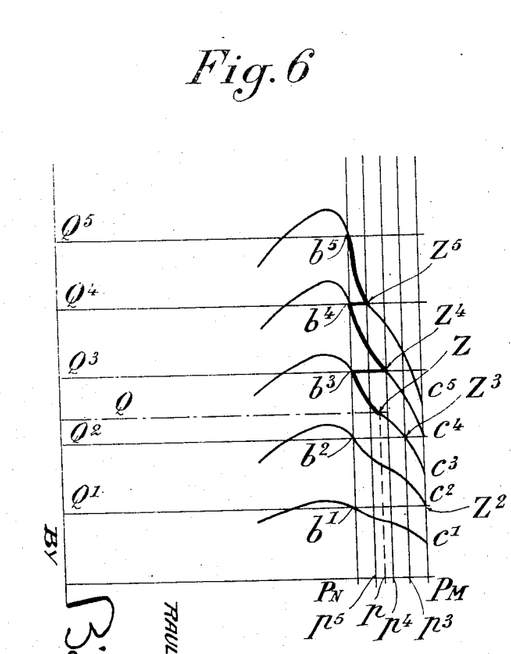

On the diagram in Fig. 6 there has been shown the characteristics to be presented by the delivery pressure curves $b^1c^1$ to $b^5c^5$ for the regulating means made in accordance with this last arrangement. If reference is made to this diagram, it will be seen that for the deliveries greater than $Q^4$ it is necessary to have the five generators in service.

For the deliveries comprises between $Q^3$ and $Q^4$, the demand of the receiving element can be satisfied by putting into service either four machines working in the neighbourhood of the normal pressure $P_N$ or five machines working in the neighbourhood of the maximum pressure $P_M$.

For the other intervals $Q^2$, $Q^3$ and $Q^1$, $Q^2$ there can also be provided different groupings of machines permitting the delivery required to be realized.

It has been seen that the automatic regulating means must always ensure the putting into service of a number of generators such that the generators operate in a regulating zone the closest possible to their normal pressure $P_N$.

In other words if, for example, the five generators are put into service, corresponding to the curve $b^5c^5$, and if the delivery required by the cylinder motors of the locomotive is lowered progressively, the means of regulation will have to cause the putting out of service of a first generator when the point of operation $Z^5$ (corresponding to the maximum delivery $Q^4$ capable of being obtained with four generators) is attained, then the stopping of the second generator when the point $Z^4$ corresponding to the discharge $Q^3$ is reached on the curve $b^4c^4$ and so on, until the point $Z^2$ has been reached corresponding to the maximum delivery capable of being obtained with a single generator.

By a suitable arrangement of the regulating means of the fuel injection discharge of each generator, for example, it will be arranged that the points $Z^2$ to $Z^5$ are on the same straight line, so that the corresponding intermediate pressures $p^5$, $p^4$ etc. may be equidistant one from the other. With the normal pressure $P_N$ each of said pressures, which are included between $P_N$ and $P_M$, limit the zone in which the regulation of the corresponding group of generators is effected, whatever may be the generators entering into the composition of this group.

It is seen on the said diagram that that zone is more important as there are less machines in service. In fact, for a single machine it covers the whole interval $P_NP_M$, whilst for five machines it extends only over the fourth of that zone.

These considerations being explained, there will now be indicated the procedure to establish automatic regulating means which, in accordance with the diagram of Fig. 6, will permit the modification of the number of generators in service when the pressure in the manifold 5 passes through the intermediate values $p^5p^4$, etc., which are in question.

If it is assumed that the control of each generator operates by the aid of a pneumatic system subordinated to a hand grip $15^1$, $15^2$ ... etc., in order to form the said means use is made advantageously of a pneumatic system comprising, amongst other elements, as many distributors $d^1$, $d^2$ ... $d^5$ as there are generators, each distributor being capable of occupying two positions corresponding to the sending of compressed air from an external source, respectively, to one or the other of the faces of a piston such as $90^1$, Fig. 5, connected to the corresponding hand grip. The face of the piston $90^1$ which is not under the action of the compressed air is in each case put into communication with the atmosphere in order to permit the movement of the said piston.

All the distributors $d^1$ to $d^5$ can then occupy the same position, corresponding to the stopping of the machines if the delivery produced is super-abundant and to their starting in the opposite case. The regulating means thus ensures the feeding of compressed air to an exactly sufficient number of the generators, in order that the delivery produced may be re-established at a suitable value. Thus, advantageously, use is made of the construction illustrated by Fig. 5.

Figure 5:
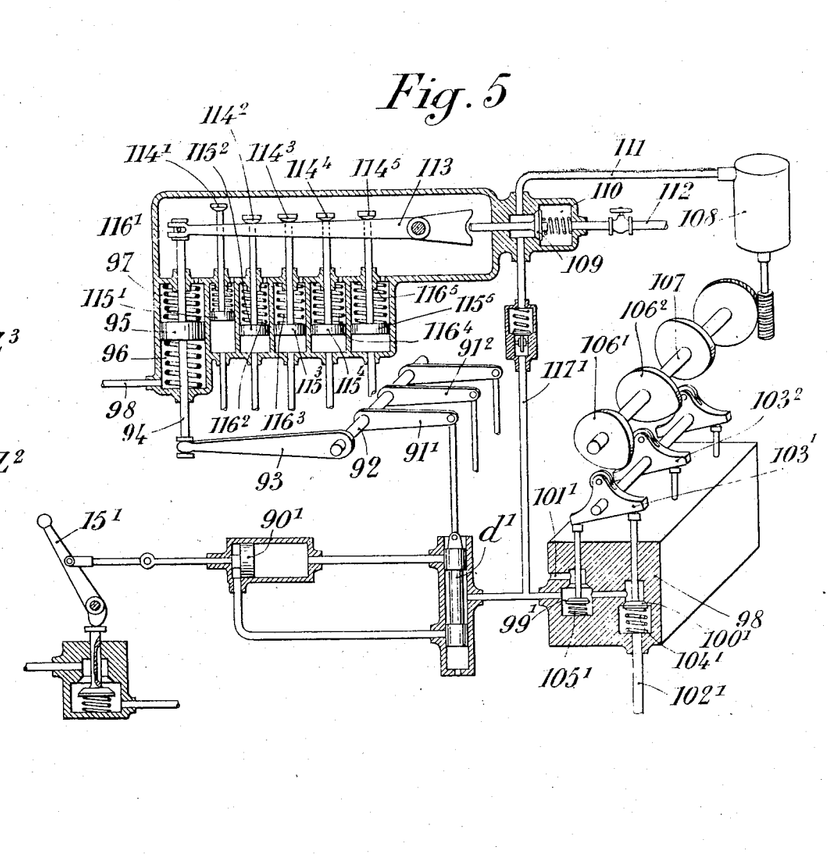
Figs. 5 and 6, respectively, show another construction of means for regulating the group of generators and the diagram relating to the said regulating means.

The distributors $d^1$, $d^2$ etc. relating to the different generators are connected to arms $91^1$, $91^2$ etc., keyed on the same oscillating shaft 92 connected by a lever 93 to one end of the rod 94 of a piston 95, kept in a mean position by two opposing springs 96 and 97.

The regulating pressure (pressure in the manifold 5) is made to act through a pipe 98 on one of the faces of the piston 95, chosen in such a manner that when the said pressure diminishes to the value $P_N$, the resulting movement of the said piston may bring all the distributors $d^1$ to $d^5$ into the same position corresponding to the starting of the generators. Conversely, when the regulating pressure passes beyond one of the intermediate regulating pressures, the said distributors may be brought into the stopping position.

In order to ensure the feeding of compressed air, or on the contrary the relief of each distributor, a system of controlled valves is provided which, as shown for the distributor $d^1$, can be arranged by housing in a casing 98 two valves $99^1$ and $100^1$, permitting the distributor $d^1$ to be connected either with the atmosphere by a conduit $101^1$ or with the source of motive compressed air by a pipe $102^1$. The stems of the valves are subjected to the action of a rocker $103^1$ and the return spring $104^1$ of the inlet valve $100^1$ is more powerful than the return spring $105^1$ of the discharge valve $99^1$, so that the latter is normally kept open and the valve $100^1$ is applied on to its seat as shown in Fig. 5.

Cams $106^1$, $106^2$, etc., co-act with the rockers $103^1$, $103^2$, etc., relating to the different distributors, and are keyed preferably at equal intervals on a shaft 107 rotated through a reduction system, for example, worm gearing, by a compressed air motor 108, the said cams being of such a form that their bosses compel the corresponding rockers momentarily to occupy positions in which the compressed air inlet valves are opened and the discharge valves closed.

In order to regulate the inlet of compressed air to the motor 108, there is provided a valve 109 arranged in a casing 110 connected to the motor 108 by a pipe 111 and to the source of compressed air by a pipe 112. The stem of the valve 109 is under the action of an oscillating lever 113, one extremity of which is provided with ramps adapted to cause the opening of the said valve when the lever is displaced on one side or the other of its mean position. The other extremity of the lever 113 is articulated on the free end of the rod 94 of the balanced piston 95, in such a manner that the displacements of the latter, following an increase or a decrease of the regulating pressure, cause the opening of the valve 109 and, consequently, the starting of the motor 108 by the aid of the lever 113.

Resilient compensating means co-act with the lever 113, in such a manner that they tend to oppose the increasing action of the regulating pressure, the force of said means being adapted to be reduced in proportion to the generators put into service, in such a manner that the sensitivity of the balanced piston 95 may be varied.

Thus, the lever 113 acts in the same manner when the regulating zone extends from the pressure $P_N$ to the pressure $P_M$ (one generator in service) as when the said regulating zone is reduced to a fourth of that value (five generators in service).

Resilient means satisfying these conditions can be arranged, for instance, by causing five abutments $114^1$ to $114^5$ connected to pistons $115^1$ to $115^5$ to act on the lever 113, said abutments being pressed by springs $116^1$ to $116^5$ tending to apply the said abutments against the lever 113, so as to oppose resiliently the action on the said lever of increasing regulating pressures. The other face of each of the said pistons is submitted to the action of the discharge pressure of one of the generators $A^1$ to $A^5$, in such a manner that when the latter are all in service, the lever 113 has the maximum sensitivity, that is to say, is relieved of the action of all the compensator springs.

The strengths of the compensator springs and the diameters of the corresponding pistons are chosen so that they are the more reduced as they are further spaced from the axis of articulation of the lever 113, so that the said springs may all have the same action on the said lever.

Advantageously, means may be provided for preventing the motor 108 and, consequently, the shaft 107 stopping when one of the cams 106 attacks one of the rockers, as this would leave the corresponding distributor under pressure. The feed pipe 111 of the motor 108 can be connected to the feed pipe of each distributor ($d^1$, $d^2$ etc.) by a pipe such as $117^1$, with which a retention valve $118^1$ co-operates. Part of the compressed air sent to a distributor being fed is thus turned away towards the motor 108 and ensures the driving of the latter after the valve 109 has returned to its closing position until the corresponding cam has liberated the rocker ensuring the feeding of the said distributor.

In consequence of which, regulating means for the plant have been established by the putting into and out of service of certain generators, the operation of the said means being as follows:

If it is assumed, by way of example, that the operator has started the five generators and that the delivery demanded by the motor cylinders of the locomotive has a value Q comprised between $Q^2$ and $Q^3$, the figurative point of the delivery, as a function of the pressure, which is found initially at $b^5$ (pressure $P_N$), will be displaced on the curve $b^5c^5$, because the excess of delivery produced brings about an increase of pressure in the manifold 5.

Immediately the pressure $p^5$ is attained, the piston 95 will be lifted and will displace the lever 113 which, at this instant, is not being solicited by any of the springs $116^1$ to $116^5$, since all the pistons $115^1$ to $115^5$ are submitted to the action of the delivery pressure of the corresponding generators.

The movement of the piston 95 will thus cause the starting of the motor 108 and bring all the distributors $d^1$ to $d^5$ into the stop position of the corresponding generators. The first cam operating a rocker will thus ensure the stopping of a generator. The pressure in the manifold 5 will fall to the value $P_N$ the figurative point of operation coming at $b^4$. The tared spring corresponding to the generator stopped will then act on the lever 113 to bring it into the mean position. However, the delivery producer being always superabundant, the pressure will commence to rise in the manifold 5 and when it has attained the valve $p^4$, the piston 95 will be displaced again against the action of the spring 97 and of the tared spring put into service previously, the variation of pressure $P_N-p^4$ being properly sufficient to overcome the action of the two springs. A new generator will thus be stopped, another tared spring will co-act with the lever 113 to bring the latter into neutral position and the pressure in the manifold 5 will reassume the value $P_N$. The delivery produced being still superabundant, the pressure will mount to a value $p$ corresponding to the point of intersection Z of the curve $b^3c^3$ with the parallel to the axis of the pressures of ordinate Q. Starting from this instant, if the discharge Q required no longer varies, the regulating means will cease to act. In fact, in order to operate the lever 101 again, there will be necessary a variation of pressure $P_N-p^3$ greater than $P_N-p$. The delivery Q demanded by the motor cylinders of the locomotive will then be furnished by three generators working in the neighbourhood of the pressure $P_N$, that is to say, in the zone of regulation the most favourable for their good operation. During this period of regulation of the number of generators, the figurative point of the delivery as a function of the pressure will have travelled through the path $b^5Z^5b^4Z^4b^3Z$ represented in thickened lines on the diagram of Fig. 6. As long as the delivery Q remains included between $Q^2$ and $Q^3$ there will be three generators in service. If the delivery becomes lower than $Q^2$, a new generator will be put out of service. If, on the contrary, it becomes greater than $Q^3$, one of the generators previously stopped will be brought back into service.

It should be noted that because the cam carrying shaft 107 always turns in the same direction, the order of stoppage of the generators will be the same as the order of starting. Thus, after a certain lapse of time, there will be every chance that all the generators will have the same number of working hours by the rule of great numbers.

Moreover, because, when the motor 108 is stopped each of the distributors $d^1$ to $d^5$ is not under pressure, the operator will always have the faculty of stopping or starting any one of the generators $A^1$ to $A^5$ by acting on the hand grip $151^1$ to $151^5$ which corresponds to the said generator.

It is also seen that the multiplying mechanism arranged between the motor 108 and the shaft 107 will produce a certain delay in the intervention of the regulating means, thus permitting the latter to intervene only in permanent working. In fact, it has been seen from the above that the cam shaft 107 is always stopped accurately after the passing over of a rocker by the boss of a cam. As the cams are fixed regularly and the shaft 107 returns very slightly, a certain time will thus always be necessary for a new cam to operate another rocker and thereby to modify the number of generators in service.

In consequence of which, and whatever may be the embodiment adopted, there is provided a plant comprising a group of several generators, of which the automatic or nonautomatic putting into or out of service of the generators is sufficiently clear from the above description of the said plant and of its means of regulation, so that it is unnecessary to deal with this subject in any complementary explanation.

In any case, such a plant presents, amongst other advantages that of lending itself easily to sharp variations of power, because free piston generators assume their normal oscillating regime instantaneously and because the generators are used in the conditions most favourable to their good operation.

According to another feature of the invention, which will be supposed, in the following description, to be applied to the plant just described, all the generators $A^1$ to $A^5$ are maintained in a thermic state favourable to their starting. For example, they are submitted to the action of the same cooling circuit.

To that end, for example, as shown diagrammatically on Fig. 1, the different generators $A^1$ to $A^5$ may be branched on a general cooling circuit 119.

The same procedure could be followed in the case of the lubricating circuit which, as in the preceding case, would permit the generators to avoid working in bad lubrication conditions under increased loads when they are started after a prolonged stoppage.

What I claim is:

1. A system which comprises, in combination, a plurality of generators of fluid under pressure, means for putting into service a variable number of said generators, means for feeding fuel to said generators, and means for automatically regulating said fuel feed means to obtain at any time from the generators in service at least substantially the same percentage of their maximum power.

2. A system which comprises, in combination, a plurality of generators of fluid under pressure, means for putting into service a variable number of said generators, means for feeding fuel to said generators, and means responsive to the action of a regulating factor common to all of said generators in service, for automatically controlling said fuel feed means to obtain at any time from the generators in service at least substantially the same percentage of their maximum power.

3. A system which comprises, in combination, a plurality of generators of gas under pressure of the free piston type, means for putting into service a variable number of said generators, means for feeding fuel to said generators, and means, responsive to variations of a regulating factor common to all of said generators in service, for automatically controlling said fuel feed means to obtain at any time from the generators in service at least substantially the same percentage of their maximum power.

4. A system which comprises, in combination, a plurality of generators of gas under pressure of the free piston type, means for putting into service a variable number of said generators, means for feeding fuel to said generators, a common discharge manifold associated with all of said generators and means, operative by the pressure in said manifold, for automatically controlling said fuel feed means to obtain at any time from the generators in service the same percentage of their maximum power.

5. A system which comprises, in combination, at least three generators of gas under pressure of the free piston type and means for putting into and out of service a variable number of said generators in response to variations of a regulating factor, common to all of said generators.

6. A system which comprises, in combination, at least three generators of gas under pressure of the free piston type, a discharge manifold common to all of said generators, and means for putting into and out of service a variable number of said generators, said means being operative by the pressure in said discharge manifold so as to increase the number of generators in service when said pressure decreases and to reduce the number of generators in service when said pressure increases.

7. A system which comprises, in combination, a plurality of generators of gas under pressure, means for putting into and out of service a variable number of said generators, responsive to variations of a regulating factor common to all of said generators, means for feeding fuel to said generators, and means for automatically regulating said fuel feed means to obtain at any time from the generators in service at least substantially the same percentage of their maximum power.

8. A system which comprises, in combination, a plurality of generators of gas under pressure, a discharge manifold common to all of said generators, means for putting into and out of service a variable number of said generators, said means being operative by the pressure in said discharge manifold, so as to increase the number of generators in service when said pressure decreases and to reduce the number of said generators in service when said pressure increases, means for feeding fuel to said generators and means operative by the pressure in said manifold for automatically controlling said fuel feed means to obtain at any time from the generators in service at least substantially the same percentage of their maximum power.

9. A system which comprises, in combination, a plurality of generators of gas under pressure, means for putting into and out of service a variable number of said generators in response to variations of a regulating factor common to all of said generators, and means for delaying the action of said last mentioned means so as to avoid too frequent stoppings and startings of said generators.

10. A system which comprises, in combination, a plurality of generators of gas under pressure, a discharge manifold common to all of said generators, means for putting into and out of service a variable number of said generators, said means being operative by the pressure in said discharge manifold so as to increase the number of generators in service when said pressure decreases and to reduce the number of said generators in service when said pressure increases, means for delaying the action of said last mentioned means so as to avoid too frequent stoppings and startings of said generators, means for feeding fuel to said generators, and means, operative by the pressure in said manifold for automatically controlling said fuel feed means to obtain at any time from the generators in service at least substantially the same percentage of their maximum power.

11. A system of the type described which comprises, in combination, a plurality of generators of gas under pressure, a distributor associated with each generator, having a starting position and a stopping position, two shafts, a series of cams mounted on each of said shafts, one of said series of cams being adapted successively to bring said distributors into their starting positions and the other series of cams being adapted successively to bring said distributors into their stopping positions, and means for actuating said shafts in response to variations of a regulating factor common to all of said generators.

12. A system of the type described which comprises, in combination, at least three generators of gas under pressure, and means for putting into and out of service, always in the same order, a variable number of said generators in response to variations of a regulating factor common to all of said generators.

13. A system of the type described, which comprises, in combination, a plurality of generators of gas under pressure, means for putting into and out of service, always in the same order, a variable number of said generators, in response to variations of a regulating factor common to all of said generators, fuel feed means for said generators and means for automatically regulating said fuel feed means to obtain at any time from the generators in service at least substantially the same percentage of their maximum power.

14. A system of the type described which comprises, in combination, a plurality of generators of gas under pressure, a discharge manifold common to all of said generators, means for putting into and out of service, always in the same order, a variable number of said generators, said means being operative by the pressure in said discharge manifold so as to increase the number of generators in service when said pressure decreases and to reduce the number of said generators in service when said pressure increases, means for feeding fuel to said generators, and means operative by the pressure in said manifold for automatically controlling said fuel feed means to obtain at any time from the generators in service at least substantially the same percentage of their maximum power.

15. A system of the type described which comprises, in combination, at least three generators of gas under pressure, and means for putting into and out of service a variable number of said generators in response to variations of the pressure of the compressed gas fed by said generators, said means being so arranged that the pressure variation necessary for starting or stopping a generator is the smaller as the number of generators already in service is greater.

16. A system of the type described which comprises, in combination, a plurality of generators of gas under pressure, a control member, operative by the pressure of the compressed gas supplied by said generators, for putting into and out of service a variable number of said generators, elastic return means so arranged as to counteract displacements of said member due to an increase of said pressure, and means for varying the strength of said elastic return means so as to reduce the intensity of said force when the number of generators in service increases, and inversely.

17. A system of the type described which comprises, in combination, a plurality of generators of gas under pressure, a control member operative by the pressure of the compressed gas supplied by said generators, a lever arranged to be actuated by said control member, means for putting into and out of service a variable number of said generators and adapted to be operated by displacements of said lever on one side or the other of the intermediate position thereof, elastic return means so arranged as to counteract displacements of said lever due to an increase of said pressure, and means for varying the action of said elastic means in accordance with the number of generators in service so as to reduce said action when the number of generators in service increases and inversely.

18. A system of the type described which comprises, in combination, a plurality of generators of gas under pressure, a control member operative by the pressure of the compressed gas supplied by said generators, a lever, arranged to be actuated by said control member, means for putting into and out of service a variable number of said generators and adapted to be operated by displacements of said lever on one side or the other of the intermediate position thereof, a plurality of return springs disposed on either side of the lever and adapted to coact therewith, and means for relieving said lever from the action of a number of springs corresponding to the number of generators actually in service.

19. A system according to claim 18 in which the springs associated with said lever are adapted to act thereon at points located at different distances from the axis of articulation of said lever, respectively, said springs being made of respective strengths such that they are the smaller as the distance of the point of action thereof on the lever from the axis of articulation thereof is greater.

20. A system of the type described which comprises, in combination, a plurality of generators of gas under pressure, a general control member operative by the pressure of the compressed gas supplied by said generators, an auxiliary source of power associated with each of said generators adapted to put said generators into or out of service, a control element for each of said generators adapted to cause the auxiliary source of power to put the corresponding generator into or out of action, means for coupling all of said control elements with said general control member, an auxiliary motor adapted to be started by said general control member when the latter is moved away from its neutral position, and means operative by said motor for connecting said control elements with said auxiliary source of power successively as said auxiliary motor is revolving.

21. A system according to claim 20 in which the last mentioned means include a cam-shaft and a speed reducing gear interposed between said camshaft and said auxiliary motor.

22. A system which comprises, in combination, a plurality of generators of gas under pressure, means for putting into and out of service a variable number of said generators in response to variations of a regulating factor common to all of said generators, and means for keeping the generators that are at rest in a thermic state which facilitates their starting.

23. A system according to claim 22, wherein said last means comprise a common cooling circuit for all of said generators, the latter being connected in parallel with said cooling circuit.

24. A system according to claim 22, further including a lubricating circuit for all of said generators, the latter being all connected in parallel with said circuit.

25. A system according to claim 1, further including a discharge manifold for all of said generators, a reservoir of gas under pressure associated with said manifold, and means responsive to pressure variations in said manifold for disconnecting said reservoir from said manifold when the pressure in said manifold drops below a predetermined value.

26. A system which comprises, in combination, a plurality of generators of gas under pressure of the free piston type, means for putting into and out of service a variable number of said generators in response to variations of a regulating factor, a discharge manifold for all of said generators, a reservoir of gas under pressure associated with said manifold, means, responsive to pressure variations in said manifold, for disconnecting said reservoir from said manifold when the pressure in said manifold drops below a predetermined value, and a spring loaded discharge valve mounted on said manifold.

27. A system which comprises at least one generator of gas under pressure of the free piston type, said generator including a starting chamber adapted to receive air under pressure for starting the generator, a feed conduit for supplying starting air to said starting chamber and means operative by the pressure existing in said starting chamber for cutting off the air-feed to said chamber and producing in said feed conduit a pressure drop which produces the starting of the corresponding generator.

28. A system which comprises at least one generator of gas under pressure of the free piston type, said generators included a control member for putting said generator into and out of service, means operative by said control member, in the put-out position thereof, for stopping fuel feed to said generator, and means, operative by the last mentioned means, in the put-out position of said control member, for moving the free pistons of said generator into their starting position and leaving them in said position.

29. A system which comprises, in combination, a plurality of generators of gas under pressure of the free piston type, means for putting into and out of service a variable number of said generators in response to variations of a regulating factor and means for totalizing the working hours of each generator, associated therewith.

RAUL PATERAS PESCARA.